United States Patent [19]

Matsuoka

[11] Patent Number: 4,594,869
[45] Date of Patent: Jun. 17, 1986

[54] METHOD AND APPARATUS OF MANUFACTURING A COIL SPRING

[75] Inventor: Takeji Matsuoka, Tokyo, Japan

[73] Assignee: MEC Machinery Co., Ltd., Tokyo, Japan

[21] Appl. No.: 630,816

[22] Filed: Jul. 13, 1984

[30] Foreign Application Priority Data

Jul. 15, 1983 [JP] Japan ................. 58-127989

[51] Int. Cl.⁴ .............................................. B21F 3/02
[52] U.S. Cl. ......................................... 72/21; 72/135
[58] Field of Search ................. 72/129, 130, 131, 132, 72/135, 138, 140, 141, 142, 21–23

[56] References Cited

U.S. PATENT DOCUMENTS

| | | | |
|---|---|---|---|
| 3,906,766 | 9/1975 | Sato | 72/132 X |
| 4,018,070 | 4/1977 | Yagusic et al. | 72/142 X |
| 4,018,071 | 4/1977 | Lampietti | 72/142 X |
| 4,026,135 | 5/1977 | Yagusic et al. | 72/142 X |
| 4,030,327 | 6/1977 | Collins et al. | 72/131 X |
| 4,064,732 | 12/1977 | Matsuoka | 72/142 X |
| 4,112,721 | 9/1978 | Takase et al. | 72/142 X |
| 4,362,038 | 12/1982 | Katahira et al. | 72/130 |
| 4,393,678 | 7/1983 | Favot et al. | 72/131 |
| 4,503,694 | 3/1985 | Takumi | 72/131 |

OTHER PUBLICATIONS

Winding of Metal Evaporator Charge Coils, Anderson et al, Western Electric Digest No. 45, Jan. 1977, pp. 1,2.

Primary Examiner—E. Michael Combs
Attorney, Agent, or Firm—Oblon, Fisher, Spivak, McClelland & Maier

[57] ABSTRACT

A method of manufacturing a coil spring wherein, an amount of sway of a connecting body connected to a swaying body to be swayed by a cam or a crank driven by a driving shaft rotating at a constant speed in order to drive at least one or more means among those for changing a pitch of active coils, forming the end portion, changing the shape of cross-section of the active coils and cutting wire material is converted into a pulse signal and is then measured on the occasion of manufacturing a coil spring and a DC servo motor which drives and rotates a core bar or pressurized co-roller for supplying a wire material to the coil forming portion is driven by such pulse signal in order to form a total coils of a coil spring.

1 Claim, 11 Drawing Figures

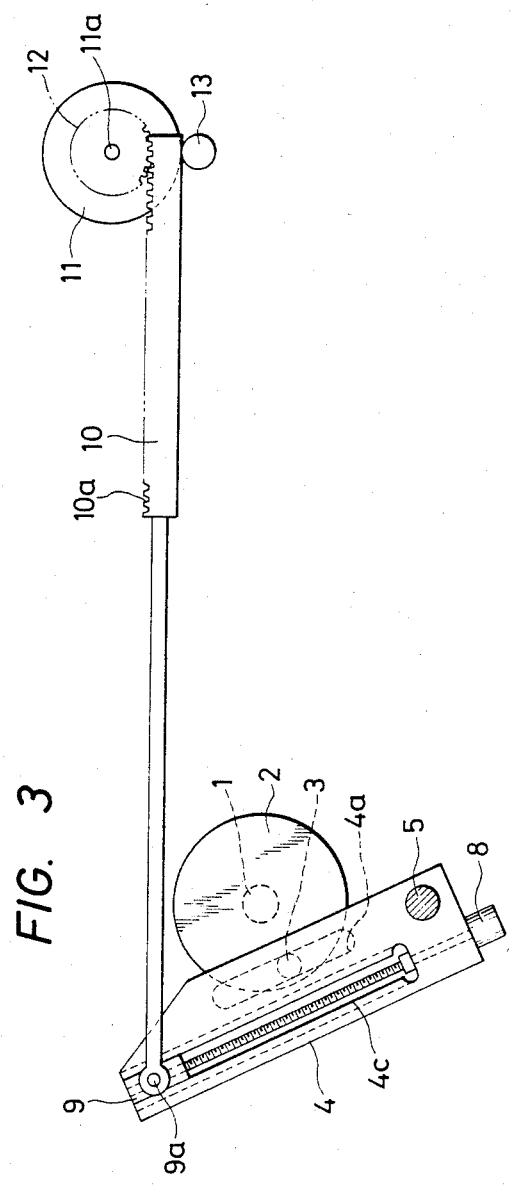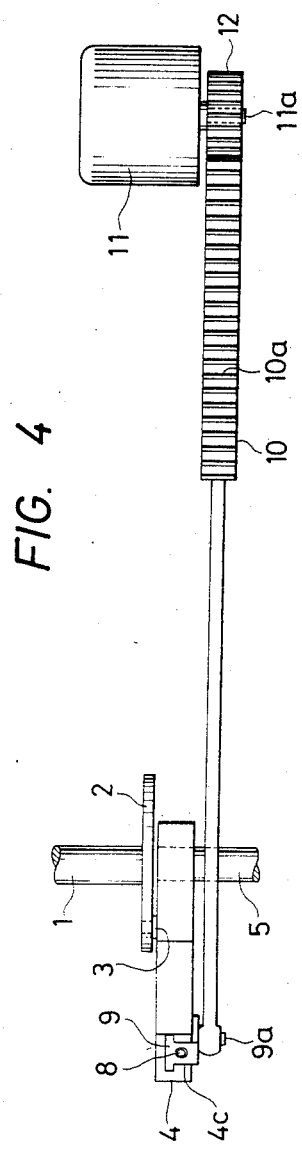

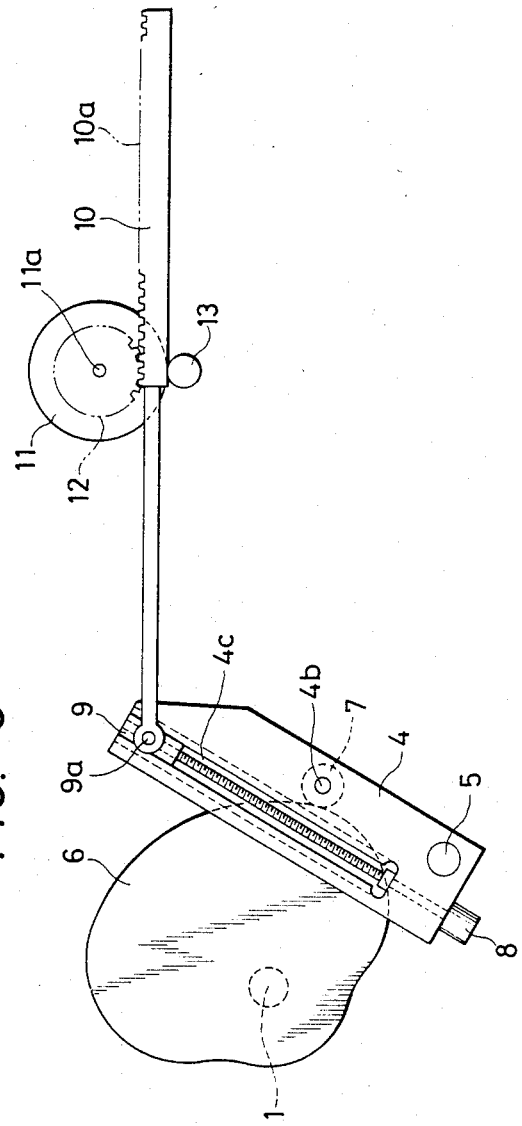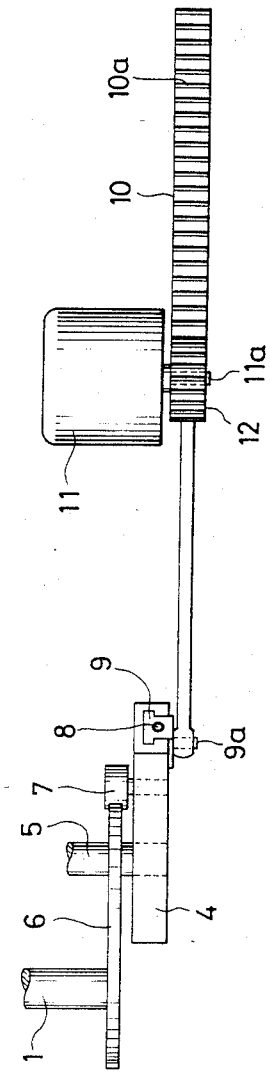

METHOD AND APPARATUS OF MANUFACTURING A COIL SPRING

FIELD OF THE INVENTION

The present invention relates to a method and apparatus of manufacturing a coil spring for accurately manufacturing a coil spring at a high speed.

BACKGROUND OF THE INVENTION

A coil spring can roughly be sorted, in accordance with kinds of loads applied thereon, into four kinds of springs of compression coil spring, tension coil spring, torsion coil spring and coil spring to which irregular load different from above three kinds of loads is applied respectively, having diversified shapes. Herein, however, accuracy of number of active coils is most important for any kind of coil spring because such active coils store strain energy in accordance with a load applied thereto. Accordingly, it is most important for manufacture of coil spring how to enhance accuracy of the active coils and how to improve the manufacturing speed.

A coil spring manufacturing apparatus can be classified into following two types of apparatus.

(1) A coil spring manufacturing apparatus of a core bar driving system wherein a wire material is wound closely or with a pitch around the circumference of the core bar while it is pulled in parallel with the process that said core bar providing a protrusion which is capable of holding the end of wire material used for forming a coil when it is inserted thereto is rotated and moved in the axial direction, and thereafter the total coils are formed by rewinding the wire material at the specified timing.

(2) A coil spring manufacturing apparatus of a pressurizingly operated co-roller driving type wherein the total coils are formed through solid winding or pitch winding of wire material by forming continuously in the specified radius of curvature while the wire material pressurizingly sent through rotation of more than one set of the pressurized feed co-rollers is pressed to a bending dies through a wire guide or by changing interrelation of bending dies to the wire material by operating a pitch tool in accordance with necessity.

As described above, a coil spring manufacturing apparatus in any kind is composed of a driving mechanism which drives and rotates a core bar or a pressurized feed co-roller for supplying a wire material to a coil forming part in order to form the total coils of coil spring and a pitch changing means for moving the core bar in the axial direction or changing relative position of bending dies to the wire material in order to change the pitch of active coils of coil spring, a means for forming the end part of coil spring like the aforementioned pitch changing means in order to change the pitch of end turn of coil spring, a means for forming a hook of the end part of coil spring, a means for changing cross-sectional shape of the active coils which move position of dies in order to change cross-sectional shape of the active coils of coil spring in such a case where a coil spring having the cross-sectional shape like a barrel is to be formed, and a wire material cutting means (hereinafter these means are called forming means). The former driving mechanism and the latter driving mechanism of the forming means are sequentially operated through cams, rotating shafts, gears and link mechanisms.

However, in the conventional coil spring manufacturing apparatus, the driving mechanism for forming a total coils of coil spring employs, as the basic driving mechanism principle, a system where a pinion is caused to make a reciprocal rotation by giving a reciprocal movement to a sector gear or rack through the rotation of crank or cam which is capable of ensuring a comparatively large number of coils and expanded length within the limited period and also economical simple harmonic motion curve. In general, in the case of pressurized feed co-roller driving system, an intermittent rotation in one direction is transmitted to the clutch shaft through the main one-way clutch and one-way clutch for back stop fixed to the pinion which makes reciprocal rotation and moreover a wire material is fed with pressure by the pressurized feed co-roller through rotation of the pressurized feed co-roller shafts by means of plural sheets of conjugated acceleration gears, however, it is also possible to complementally feed a wire material with pressure for a short period by connecting, for the auxiliary feed, a cam and a link mechanism operated by said cam to the abovementioned one-way clutch for back stop. In the case of the core bar driving system, on the other hand, as is already disclosed in the Patent Applications Laid-Open Nos. 1354/1976 and 69562/1979, the prescribed object is attained by employing many gears and links and hydraulic apparatus, but these patent applications have following disadvantages. Namely, (1) An over-running caused by a force of inertia of related link mechanism, gear and shaft makes difficult the accurate control and accurate control is difficult due to influence of backlash provided to gears. Therefore, accuracy of a number of coils and feed length of wire of coil spring manufactured is low.

(2) The stopper mechanism or brake mechanism and a mechanism for operating such mechanism in the specified timing are necessary in order to improve such low accuracy. Accordingly, a coil spring manufacturing apparatus is complicated and becomes expensive and moreover requires troublesome maintenance and control.

(3) Many mechanical parts such as related link mechanisms, gears and shafts are used and thereby it is difficult to quickly start high-speed driving and to enhance manufacturing capability of coil spring. When high speed driving is carried out, a force of inertia of mechanical parts becomes large, accuracy is deteriorated greatly and moreover a failure rate increases due to damage of mechanical parts.

(4) Since many mechanisms are combined, operating procedures are complicated and trial and error must be experienced by several reciprocal operations in order to change a number of coils and feed length of wire of coil spring.

(5) A driving time of driving mechanism for forming the total coils of coil spring during a turn of the principal driving shaft of machine is fixed, there are much restrictions on the diversified application field of coil spring manufacturing apparatus. Thereby, it is difficult to form a coil spring having a large number of coils and a long feed length of wire. Simultaneously, it is difficult to take a longer time for driving the forming means and to form a coil spring having complicated shape of end portion.

As described above, the conventional coil spring manufacturing apparatus has various disadvantages and these disadvantages have been attributed to a driving mechanism which supplies a wire material to a coil forming part in order to form the total coils of coil spring. Thus, in view of eliminating the aforementioned disadvantages, a numerically-controlled coil spring manufacturing apparatus has been developed. In such an apparatus, a driving mechanism which supplies a wire material to the coil forming part in order to form the total coils of coil spring is not driven by driving force of the main driving shaft of a machine through respective mechanisms but is driven by another driving mechanism independent of said main driving shaft in synchronization with the driving of forming means.

However, such a numerically-controlled coil spring manufacturing apparatus has following practical defects that it is difficult to easily, economically and accurately synchronize such driving mechanism and rotation of the principal shaft of a mechanism for driving the forming means even in case of changing the specification of coil spring to be manufactured, and productivity is rather deteriorated due to increase in cost and low driving speed in comparison with high speed operation, accuracy, cost reduction and versatility of the simplified forming means in the conventional coil spring manufacturing apparatus which is mainly driven by various operations of forming cams which are driven by a general purpose power motor which rotates continuously at a constant rate. Such a numerically-controlled coil spring manufacturing apparatus is not desirable for productivity in the following point that in case a DC servo motor is driven, when a command pulse train is input as shown in FIG. 1, pulses are counted and accumulated by a deviation counter of the positioning control circuit. It is then converted to DC analogue voltage by a digital-analogue converter and it becomes a speed command of servo pack owing to the control circuit. Thereby a DC servo motor is driven. In synchronization with such driving, an optical tachometer directly connected to the motor shaft generates pulses proportional to a rotating angle of the motor shaft and thereby the pulses in the deviation counter are subtracted. Thereby, if the constant command pulses are continuously input, a DC servo motor continues steady rotation, but a DC servo motor continues rotation until the pulses in the deviation counter becomes zero even when there is no input of command pulse as shown in FIG. 2. Accordingly, a large difference is generated between rotation of DC servo motor and command pulses.

Namely, a DC servo motor cannot rapidly reach the rotating speed which is proportional to a frequency of command pulse due to a force of inertia of the rotating part of servo motor and that of devices to be driven and is delayed as much as the content accumulated in the deviation counter. Such amount of content, namely delay of rotation, becomes large as the frequency of command pulse becomes high, in other words, the number of rotation of servo motor becomes high. As a result, it is impossible for the coil spring manufacturing apparatus to synchronize the driving mechanism which supplies a wire material to the coil forming part in order to form the total coils of coil spring and the driving mechanism of forming means. However, it may become possible to synchronize a DC servo motor for supplying a wire material to the coil forming part and the forming means by increasing or decreasing the frequency of command pulse train using a very high speed computer, but it is not desirable because employment of such high speed computer makes considerably expensive apparatus.

The inventor of the present invention does not intend to employ a numerical control which results in increase of cost and low operation speed but have perceived that improvement is required for the driving mechanism which supplies a wire material to the coil forming part in order to form the total coils of coil spring. Accordingly, the inventor does not employ a complicated NC system isolated from the coil spring manufacturing apparatus and have succeeded in development of an economical numerically-controlled coil spring manufacturing apparatus which directly utilizes characteristics such as high speed operation, high accuracy, cost reduction and versatility of the simplified forming means in the widely used conventional coil spring manufacturing apparatus which is mainly driven by operations of various forming cams which are driven by a general purpose power motor which rotates continuously at the constant rate and a simplified mechanism which always can synchronize with a wide range of rotation from very low irregular speed rotation by manual driving required for changing the number of coils or feed length of wire of coil spring to a speed rotation as high as about 350 rpm, for example.

SUMMARY OF THE INVENTION

The present invention provides a method of manufacturing a coil spring wherein, an amount of sway of a connecting body connected to a swaying body to be swayed by a cam or a crank driven by a driving shaft rotating at a constant speed in order to drive at least one or more means among those for changing a pitch of active coils, forming the end portion, changing the shape of cross-section of the active coils and cutting wire material is converted into a pulse signal and is then measured on the occasion of manufacturing a coil spring and a DC servo motor which drives and rotates a core bar or pressurized co-roller for supplying a wire material to the coil forming portion is driven by such pulse signal in order to form a total coils of a coil spring.

BRIEF DESCRIPTION OF THE DRAWINGS

FIG. 3 is a front view of the principal portion in the embodiment of the present invention wherein a crank is used as a means for swaying a swaying body. FIG. 4 is a plan view of FIG. 3. FIG. 5 is a front view of the principal portion in the embodiment of the present invention wherein a cam is used as a means for swaying a swaying body. FIG. 6 is a plan view of FIG. 5.

DETAILED DESCRIPTION OF THE INVENTION

A method of manufacturing a coil spring of the present invention is described hereunder in detail with respect to the attached drawings.

Figure 10:
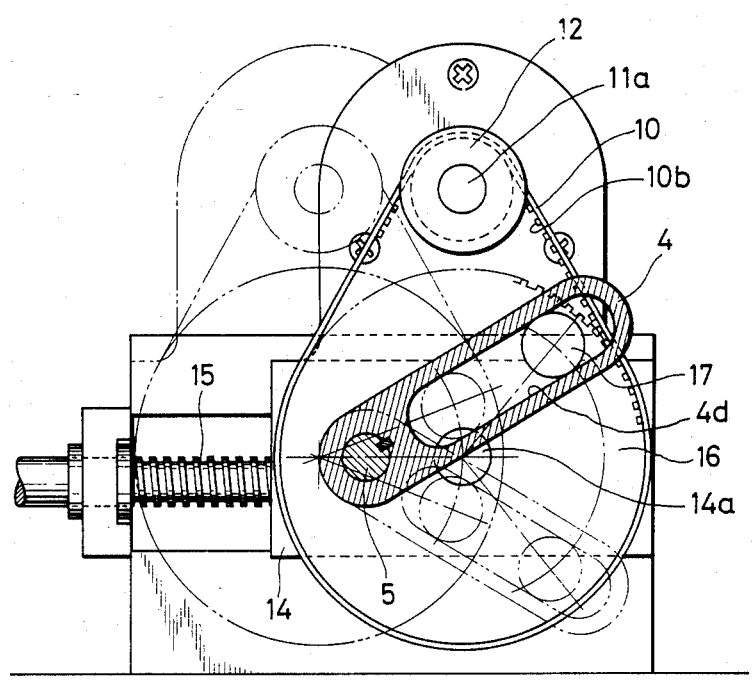
FIG. 10 is a cross-sectional view along the line B—B of FIG. 8.
Figure 11:
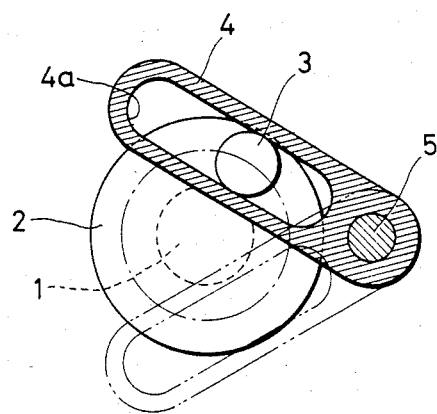
FIG. 11 is a cross-section view along the line C—C of FIG. 8.

In the drawings, 1 is a driving main shaft which is rotated at a constant speed, on the occasion of manufacturing a coil spring, for driving at least one of the means for changing a pitch of active coils of coil spring (not shown), a means for forming the hook part at the end of coil spring, a means for changing cross-sectional view of the active coils of coil spring (not shown) and a means for cutting the end part of wire material (not shown). This driving main shaft 1 is driven by a general purpose motor which is rotated usually at a constant speed. 2 is a crank fixed to the shaft end of the driving main shaft 1. This crank 2 is provided with a crank pin 3 which is eccentrically located at the specified position for the driving main shaft 1. 4 is a swaying body which is swayed about the center shaft 5 fixed to the coil spring manufacturing apparatus body. This swaying body 4 is provided with a long groove 4a. Since this long groove 4a is slidably engaged with a crank pin 3, when the crank 2 is rotated at a constant speed by the driving main shaft 1, the crank pin 3 moves on a circle about the driving main shaft 1. As a result, the swaying body 4 with which the crank pin 3 is engaged at the long groove 4a is caused to sway about the center shaft 5. 6 is a cam secured to the shaft end of driving main shaft 1. 7 is a cam-follower which is rotatably loaded to a fixed shaft 4b protruded to the swaying body 4. This swaying body 4 is caused to sway about the center shaft 5 in the same way as the crank 2 so long as the cam surface of cam 6 which is rotated by the driving main shaft 1 is in contact with the cam follower 7. 8 is an adjusting screw loaded to a guide groove (having the T-shaped cross sectional view in FIG. 5 and FIG. 6) provided to the swaying body 4. 9 is a sliding body which is slidable along the guide groove 4c and is engaged with the adjusting screw 8. 10 is a connecting body having the structure where the one end thereof is connected with a connecting shaft 9a protruded from the sliding body 9 as shown in FIG. 3–FIG. 6, while the other end is provided with a rack 10a or the structure of serration belt having the tooth 10b at the contact surface externally provided to the pinion 16 as shown in FIG. 10. 11 is a rotary encoder which converts an amount of sway of connecting body 10 into a pulse signal for measurement. 12 is a pinion which is fixed to the shaft 11a of rotary encoder 11 and is engaged with the rack 10a or tooth 10b provided to the connecting body 10. 13 is a guide roller which holds the rack 10a of the connecting body 10 in combination with the pinion 12 so that the engagement between the pinion 12 and the rack 10a of the connecting body 10 is ensured in case the pinion 12 and the rack 10a are engaged with each other. 14 is a sliding body which slides along the guide groove provided to the spring manufacturing apparatus body and is engaged with an adjusting screw 15. 16 is a pinion fixed to a rotating shaft 14a loaded to the sliding body 14. 17 is a pin eccentrically located for the rotating shaft 14a of pinion 16 and is slidably engaged with the long groove 4d provided to the swaying body 4.

With such a structure, when the driving main shaft 1 is caused to make a single turn, the crank 2 or cam 6 fixed to the shaft end of driving main shaft 1 also makes a single turn. In the case of the crank 2, the swaying body 4 is caused to sway about the center shaft 5 through the crank pin 3, while in case of the cam 6, the swaying body 4 is caused to sway through the cam follower 7. The swaying operation of this swaying body 4 is transmitted to a rotary encoder 11 through the connecting body 10 connected directly or indirectly to the swaying body 4 and is then converted to a pulse signal therein. In this case, a swaying angle of the pinion 16 can be changed by changing the connecting position of the connecting body 10 to the swaying body 4 or by moving the sliding body 14 as indicated by the broken line in FIG. 10 with operation of the adjusting screw 15, by sliding forward or backward the sliding body 9 connecting the swaying body 4 and the connecting body 10 along the guide groove 4c through the operation of adjusting screw 8. Accordingly, amount of sway and speed of sway of the connecting body 10 can be changed. Namely, amount of sway of the connecting body 10 can be set to the desired value within the range wherein the driving main shaft 1 rotates for the specified angle. Rotation of the driving main shaft 1 is transmitted to the rotary encoder 11 as described above and is measured as a pulse signal and is used as a command pulse train for driving a DC servo motor which drives and rotates the core bar or pressurized feed co-roller which supplies a wire material to the coil forming part in order to form the total coils of coil spring. In this case, when a pressurized feed co-roller is used as a means for supplying a wire material to the coil forming part, it is no longer required to rewind the wire material from the coil forming part. Therefore, a pulse generated during reverse rotation of the shaft 11a of the rotary encoder 11 by the electric circuit provided to said rotary encoder 11 is not supplied as the command pulse. Meanwhile, in case a core bar is used as the means for supplying a wire material to the coil forming part, it is necessary to rewind the wire material by reversely rotating the wire material by the same number of coils after winding the wire along the circumference of the core bar. Accordingly, a pulse generated by the electric circuit provided to the rotary encoder 11 is supplied as the command pulse for both normal and reverse rotations of the shaft 11a of said rotary encoder 11.

As described with respect to the embodiment shown in FIGS. 3–6, amount of sway of the connection body 10 directly connected to the swaying body 4 to be swayed by the cam or crank driven by the driving main shaft 1 can easily be approximated to a simple harmonic movement curve. Therefore, change of acceleration at the time of starting or ending the rotation occurs but is very small, if any, and moreover such change is very smooth while it is swayed and the characteristic is most suited to the control of a DC servo motor. Furthermore, not only the structure for generating the command pulse suited to the drive of such DC servo motor can be formed simply and economically but also synchronization with rotation of the driving main shaft 1 is ensured. Accordingly, the present invention can be effectively introduced for adjustment in such a case where ratings of coil spring are changed by manually rotating the driving main shaft 1. The present invention also provides the advantages that since backlash between the teeth of the pinions 12 and 16 and the teeth 10b of the connecting body 10 can almost be eliminated by employing the structure that the connecting body 10 is connected with the swaying body 4 using the connecting body 10 of the serration belt structure having the teeth 10b at the contact surface externally loaded to the pinion 16 to be swayed by the swaying body 4 to be driven by the driving main shaft 1 and the pinion 12 fixed to the shaft 11a of the rotary encoder 11 as shown in FIG. 8–FIG. 11, an amount of sway of the connecting body 10 is directly transmitted to the rotary encoder 11 and the characteristic which is almost the same as the simple harmonic movement curve can be obtained, and simultaneously the apparatus can also be reduced in size and can be operated smoothly through reduction in weight owing to employment of aluminum alloy for the pinions 12 and 16.

Figure 1:
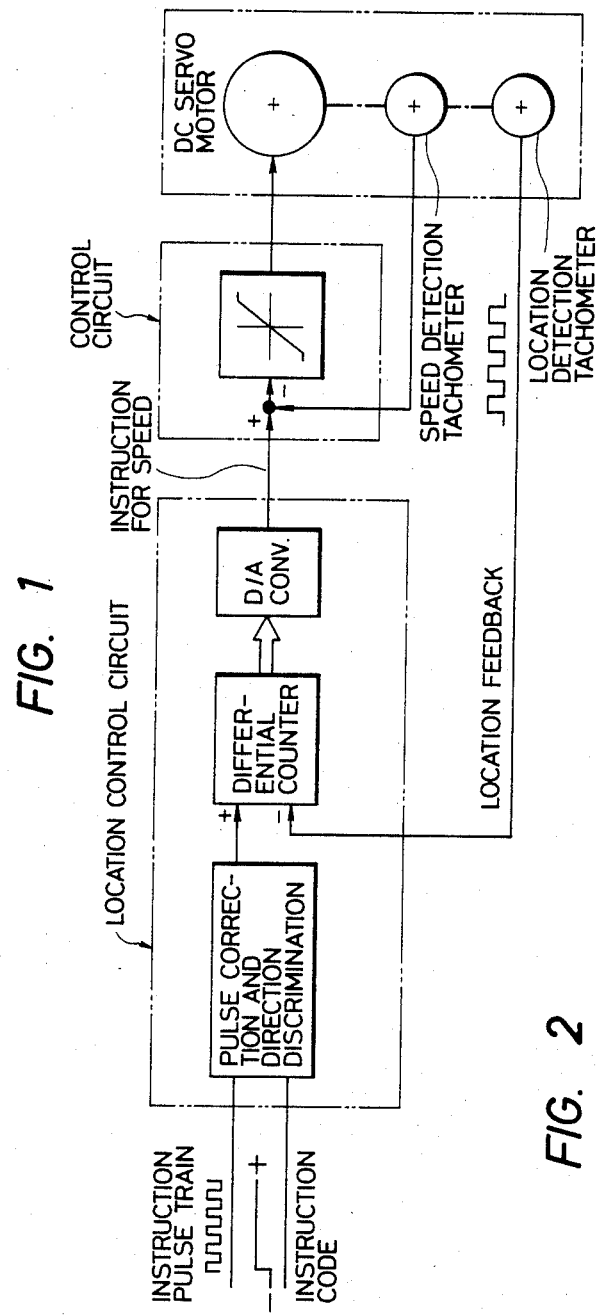
FIG. 1 shows a driving system for a DC servo motor of the prior art.
Figure 2:
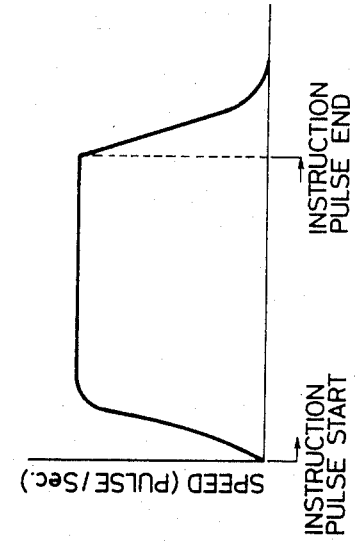
FIG. 2 indicates driving condition of a DC servo motor of the prior art.
Figure 7:
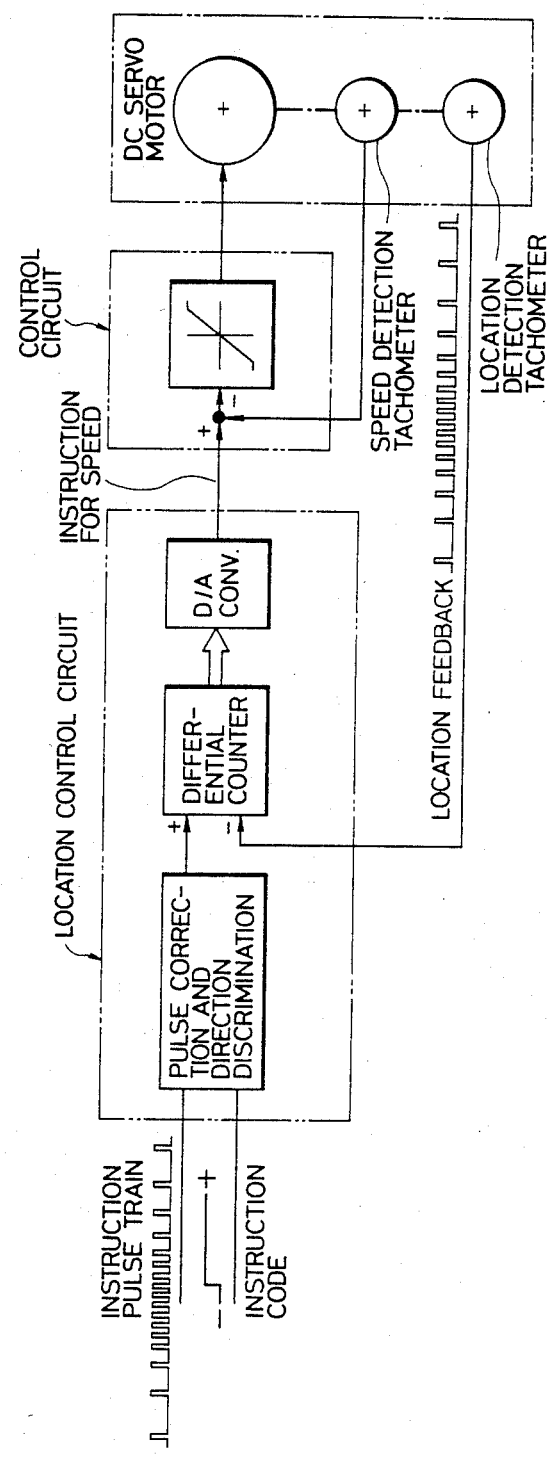
FIG. 7 is a driving system of a DC servo motor of the present invention.
Figure 8:
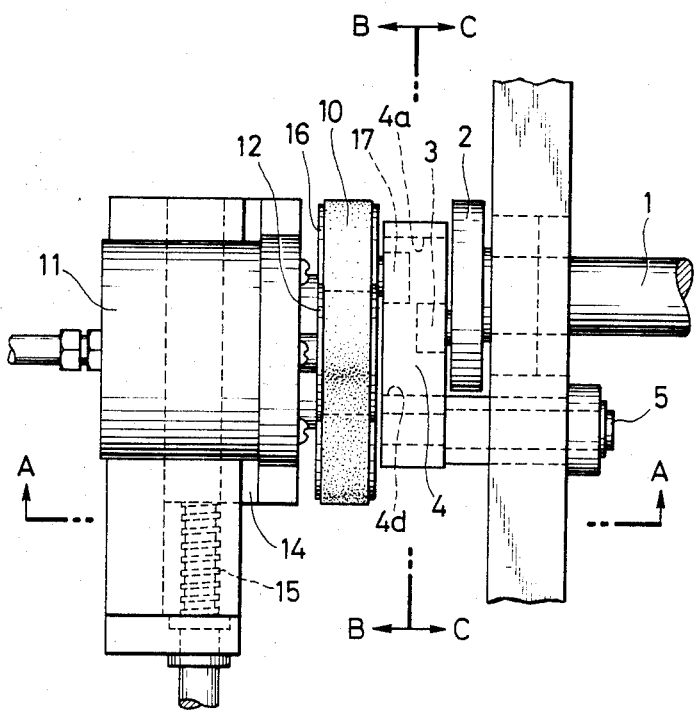
FIG. 8 is a plan view of the principal portion in the embodiment of the present invention wherein a connecting body consisting of serration belt of crank is used as a means for swaying a swaying body.
Figure 9:
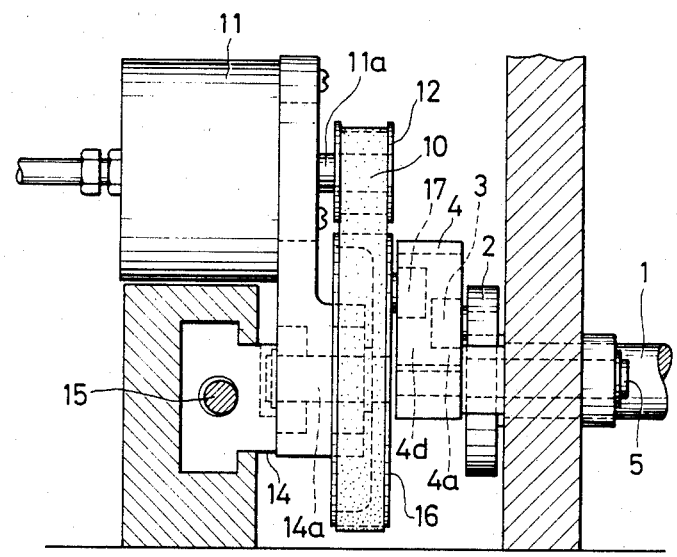
FIG. 9 is a cross-sectional view along the line A—A of FIG. 8.

A driving system of the DC servo motor in the present invention is not different from the conventional driving system of the DC servo motor as shown in FIG. 7, but the command pulse train can be approximated to the ideal simple harmonic movement curve where the interval of command pulse train becomes wide immediately before the DC servo motor starts or completes the operation and becomes narrow for the intermediate period where influence of a force of inertia of the rotating part of the DC servo motor and that of the device to be driven disappears. Accordingly, only a small amount of pulses is accumulated in the deviation counter in the positioning control circuit and thereby excellent synchronization can be ensured between the driving mechanism which supplies a wire material to the coil forming part and the driving mechanism of said forming means.

A method of manufacturing a coil spring of the present invention described above in detail has various advantages listed below and assures extensive effect from the industrial point of view.

(1) A means for supplying a wire material to the coil forming part in order to form the total coils of coil spring is not driven directly by a driving force of the driving main shaft of the coil spring manufacturing apparatus and employs the structure where core bar or pressurized feed co-roller is directly driven by a DC servo motor isolated from the driving main shaft. Therefore structure of the means for supplying a wire material to the coil forming part is simplified and reduced in weight and accordingly influence of inertia of the apparatus is almost eliminated and coil forming accuracy can be very much improved.

(2) A means for supplying a wire material to the coil forming part is simplified and reduced in weight as described above accurately synchronizes with rotation of the driving main shaft of the coil spring manufacturing apparatus, and a command pulse of which frequency changes smoothly along the simple harmonic movement curve where acceleration changes smoothly, which is suited to minimize influence of inertia of the rotating part of the DC servo motor and accumulation of pulses in the differential counter, can be obtained economically with the simplified structure.

(3) A positioning control circuit can be designed easily and economically since a command pulse of which frequency smoothly changes along the simple harmonic movement curve can be supplied as a command pulse required for driving a DC servo motor. Moreover, such a highly accurate synchronization as high as within 5 degrees during a single turn of the driving main shaft as compared with manual rotation can be confirmed even in such a case that a rotating speed of the driving main shaft is 300 rpm, the start and stop frequency is 300 per minute and the maximum rotating speed of DC servo motor is 300 rpm. Accordingly, highly efficient manufacture of coil spring can be realized within the allowable manufacturing range of coil spring.

(4) In general, a positioning control circuit requires a larger current for larger change of frequency of the command pulse train generated for a DC servo motor. But, since a command pulse train of which frequency changes a little along the rate of simple harmonic movement curve is employed, power consumption is very low even when a DC servo motor is driven at a high speed and accordingly it can be designed with a high repetition frequency for start and stop modes. Such advantage is particularly convenient for manufacture of a compression coil spring and the present invention has succeeded in manufacturing a very accurate compression coil spring in such a high speed rotation of the driving main shaft as 350 rpm.

What is claimed is:
1. An apparatus for making coil springs comprising:
a driving main shaft driven at a constant speed;
a cam attached to said drive shaft;
a center shaft placed in proximity to said cam
a swaying body having a longitudinal groove attached to said center shaft;
a cam follower on said swaying body and operatively associated with said cam for causing said swaying body to sway about said center shaft in response to the motion of said cam;
a sliding body placed in the longitudinal grove of said swaying body;
a connecting body coupled at one end to said sliding body and having a rack on the other end thereof;
a rotary encoder for emitting electrical pulses in response to rotation of said rotary encoder;
a pinion attached to said rotary encoder for coupling said connecting body's racked end to said rotary encoder;
a location control circuit electrically coupled to said rotary encoder for converting said pulses from said rotary encoder into speed control signals in accordance with instruction codes;
control circuit means coupled to said location circuit means for providing control signals;
a DC servo motor coupled to and controlled by said control circuit means for driving and rotating a core bar for supplying wire material to the coil forming apparatus;
a speed detection tachometer, coupled to said DC servo motor and coupled to said control circuit and providing feedback to said control circuit for altering said control signals produced by said control circuit; and
a location detectors tachometer coupled to said DC servo motor and said location control circuit for altering said speed control signals.

* * * * *